United States Patent [19]

Gutermuth

[11] Patent Number: 4,877,430
[45] Date of Patent: * Oct. 31, 1989

[54] SEPARATOR FOR GASEOUS FLUIDS

[76] Inventor: Paul Gutermuth, D-6456 Langenselbold, Fed. Rep. of Germany

[*] Notice: The portion of the term of this patent subsequent to May 16, 2006 has been disclaimed.

[21] Appl. No.: 234,131

[22] Filed: Aug. 18, 1988

Related U.S. Application Data

[63] Continuation of Ser. No. 144,617, Jan. 11, 1988, abandoned.

[30] Foreign Application Priority Data

Jun. 19, 1985 [DE] Fed. Rep. of Germany ....... 3521927
Oct. 8, 1985 [DE] Fed. Rep. of Germany ....... 3535911

[51] Int. Cl.$^4$ ............................................. B01D 45/00
[52] U.S. Cl. ........................................ 55/269; 55/436; 55/440; 55/446
[58] Field of Search ................. 55/436, 269, 440, 442, 55/443, 444–446

[56] References Cited

U.S. PATENT DOCUMENTS

| | | | |
|---|---|---|---|
| 422,056 | 2/1890 | Martin | 211/39 |
| 972,534 | 10/1910 | Hickey | 55/444 |
| 1,906,874 | 5/1933 | Platt | 24/457 |
| 2,523,529 | 9/1950 | Zwickl | 55/442 |
| 3,251,069 | 5/1966 | Clark | 24/545 |
| 3,515,284 | 6/1970 | Taylor | 211/60.1 |
| 3,566,585 | 3/1971 | Voloshen et al. | 55/DIG. 36 |
| 3,834,135 | 9/1974 | Jordan | 55/444 |
| 3,910,782 | 10/1975 | Struble et al. | 55/DIG. 36 |
| 4,175,935 | 11/1979 | Gutermuth et al. | 55/269 |
| 4,189,990 | 2/1980 | Kittler | 55/440 |

FOREIGN PATENT DOCUMENTS

| | | |
|---|---|---|
| 2901748 | 7/1980 | Fed. Rep. of Germany . |
| 500690 | 3/1920 | France . |
| 699760 | 11/1953 | United Kingdom . |

Primary Examiner—Bernard Nozick
Attorney, Agent, or Firm—Jordan B. Bierman

[57] ABSTRACT

A separator for fluids having first and second section parts arranged in rows. The parts are, in cross section, open and trough-shaped, with edges which overlap. Each section part has an inner protrusion extending in the longitudinal direction thereof, which protrusion causes increased swirling and thus cleaning of the fluids flowing through the section parts. The section parts can be retained in a detachable manner in a holder to permit easy cleaning.

17 Claims, 10 Drawing Sheets

SEPARATOR FOR GASEOUS FLUIDS

This is a continuation division of Ser. No. 144,617 filed 1-11-88, now abandoned.

FIELD AND BACKGROUND OF THE INVENTION

The invention relates to a separator for gaseous fluids such as cooling fluids, oil mist, fat mist, air containing dirt particles with at least two rows of first and second section parts arranged facing each other, said section parts being in cross-section open and trough-shaped, whereby the free longitudinal edges of the border areas of the first section part overlap with the free longitudinal edges of the border areas of the second section part.

A corresponding separator is contained in Published German patent application No. 26 41 765 and published German patent application No. 27 18 611. The single section parts—which can also be termed troughs—are in this case anchored firmly in a frame. In order to remove dirt which has collected between the section parts the entire separator has to be removed from a false ceiling for example or from a casing holding several separator plates and cleaned. In Swiss Pat. No. 550 018 a separator is described in which the edges of the trough-shaped section parts facing each other overlap without chambers which influence the fluid's speed of flow being formed between them. However the section parts of one particular row are held by a frame which can be removed independantly of the rest. This ensures a certain simplification in cleaning. Nevertheless large separators are unwieldy, which is undesirable. Summary of the invention The aim of the invention is on the one hand to develop a separator of the type previously described so that a higher degree of separation is possible. The invention is also based on the aim of cleaning the separator, ie. the section parts, easily, and of being able to produce separators with varying surface areas without intricate steps being necessary.

According to the invention the aim is solved on the one hand in that the section part forming chambers has a protrusion emanating in the crown area of the inner area extending towards the section part opening and slong its longitudinal axis. Due to the presence of the protrusion, which in cross-section is preferably formed in the shape of a drop or knob and can be termed an interior protrusion emanating from the crown area of the inner surface, additional chambers are provided in the area of the section part or respectively to the edges of a neighbouring section part engaging the section part, resulting in a continuing influence on the speed of flow of the fluids flowing through the separator, whereby on the other hand separation is raised to an unexpectedly high degree.

So long as each section part is trough-shaped so that the edge areas of the section parts arranged in rows extend downwards to such an extent that a chamber is formed between the narrow passages of the edge areas which influences the fluid's speed of flow, two further chambers are formed by the protrusion via which the fluid can be slowed down or speeded up when flowing through, resulting in a multistage cyclone system.

In the embodiment of the invention the exterior areas of the protrusions are at least sectionally structured through protrusions, recesses or area sections describing angles to each other, resulting in an additional swirling. This has the simultaneous effect that the surfaces of the protrusions clean themselves. This texturisation is preferably provided in the area of the front free end of the protrusions.

The inner end/or outer area of a certain section part can also at least sectionally be texturised in order to also provide an additional swirling and thus a higher degree of separation. This texturisation can also be formed by protrusions, recesses, wave structure or surface areas describing angles to each other.

On the other hand the aim of the invention is solved in that each section part is arranged in the separator in a detachable manner. Due to its detachability the section part can be easily removed and therefore for example easily cleaned and replaced. The single section parts also only need to be cut into the required lengths to be fit into the frame already present. Through the detachable arrangement of the single section parts in the separator there is also the possibility that the section parts can be rotated on their longitudinal axis, resulting on the other hand in an adjustability of the chambers influencing the speed of flow. Consequently separation can be increased or decreased in certain required areas of the separator.

In cross-section the section parts themselves can be arch, V or U shaped. In particular an arch shape of over 180° should be noted, so that the edge areas turn back to form further chambers. The invention further distinguishes itself in that the protrusion and/or the section parts of hollow construction or respectively the section part can be cooled by pipe elements connected in a fixed or detachable manner to the section part, of which said pipe elements one forms the protrusion. Media of adjustable temperature can flow through the pipe elements. Water or a vapour such as steam or cooling air comes into question as the medium.

In order to permit easy fixing of the section parts in the separator, holding elements are provided which are developed so that they enclose the section parts with their opening facing the fluids sectionally and at least partly from the outer area. The section parts with the outer areas facing the vapours to be cleaned are fixed by a part encircling of the inner protrusion. At least the areas of the holding element holding the section parts are thereby constructed in an elastic manner. The holding elements themselves can for example be retained by metal tracks which for their part have sections which cover the front areas of the section parts. The tracks containing the holding elements can thereby be constructed so that they are adjustable to the required extent in the same direction, so that as a consequence the separation areas are adjustable relative to the fluids permeating. A construction is thereby possible with which the tracks containing the holding elements is so arranged that the separator comprises two separation areas including a pointed angle, whose angle of inclination is adjustable.

The holding elements can for example be made of rubber, plastic or metal and can be developed in the way of a strip which has the necessary recess to interact with the section parts. However in an embodiment of the invention which should be particularly noted the holder for the section parts consists of single elements which can be placed in a row together, said single elements comprising first and second strip-like sections emanating in each case from a base element and angled to said base element and having spring properties, whereby the first sections partly encircle the section parts with the openings facing the rising fluids and the second sections hold with their end sections the inner protrusions of the section parts facing the rising fluids with their outer areas to fix said section parts. Through a corresponding embodiment of the holding element the single elements need only to be placed in a row side by side according to the number of section parts necessary for a separator, in order to arrange the section parts easily in a detachable manner. The spring properties of the strip-like sections which are angled off the base surface guarantee thereby a sure anchorage and one which can be loosened without tools.

Through the proposal according to the invention a separator is consequently provided whose single elements are not arranged rigidly in a frame. On the contrary, the separators can have the required surface areas without any problems. For this it is only necessary for the section parts to be cut to the required length in order to be then fixed in the holder in a detachable manner. This also has the advantage that easy and visible cleaning of the separator in all areas is possible by removing only single section parts. Due to the presence of the inner protrusions on the one hand the speed of flow of the air contaminated with particles or fluids between the section parts is positively influenced so that a higher degree of separation is achieved, and on the other hand the section part achieves an inherent strength, so that separators of large dimensions can be provided without danger, which also adhere to the teaching according to the invention. Further details, advantages and characteristics of the invention can be drawn not only from the claims—from which the characteristics are to be drawn on their own and/or in combination—but also from the following description of the preferred embodiments represented in the drawing.

BRIEF DESCRIPTION OF THE DRAWING

FIG. 1a shows: a section part fixed in a holding element.

FIG. 18a shows: a detached representation of the elements of FIG. 18.

DETAILED DESCRIPTION OF THE PREFERRED EMBODIMENTS

Figure 1:
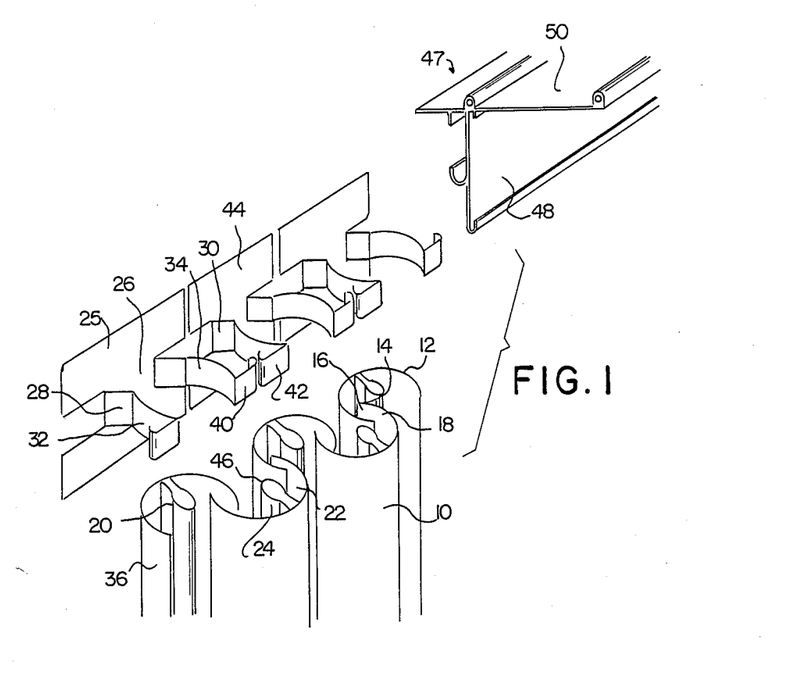
FIG. 1 shows: a first embodiment of a separator in sectional and exploded view.
Figure 2:
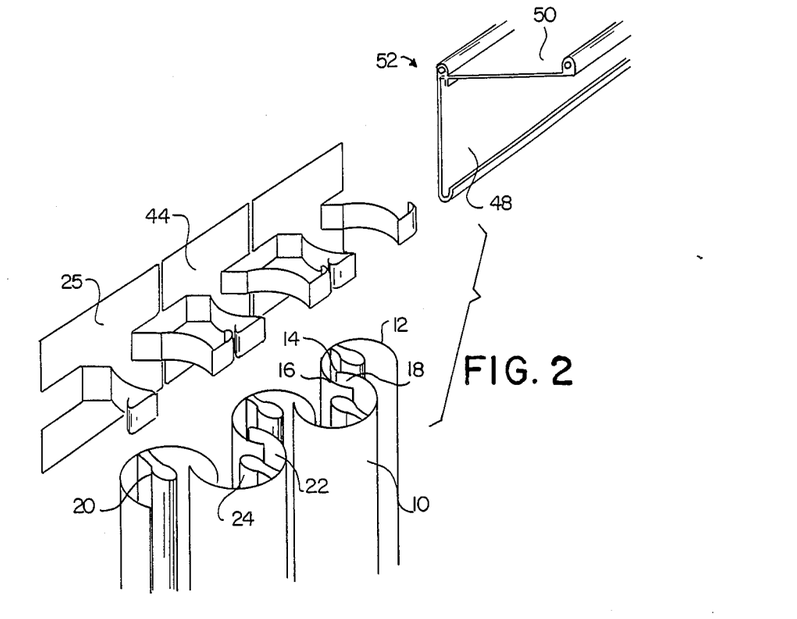
FIG. 2 shows: a second embodiment in sectional and exploded view.

FIG. 1 and 2 represent sections of a separator according to the invention comprising trough-shaped open section parts 10, 12, whose edge areas 14, 16 cooperate to such an extent that chambers 18 form between the narrow areas of the edge areas. (These are however not necessarily required, as the representation in FIG. 13 clarifies.) Furthermore the section parts 10, 12 have protrusions emanating from the inner surface extending in the direction of the longitudinal axis, whereby further chambers 22, 24 are formed to the bordering inner areas or respectively to the edge of the bordering section part. The section parts 10, 12, arranged in an overlapping fashion, now serve to clean gaseous fluids for example such as cooling fluids, oil mist, air containing dirt particles and are assembled into so called separators. As due to the edges 14, 16, 18 cooperating dipping and in addition due to the protrusions 20, chambers 18, 22 and 24 are formed which the fluids flow through, the speed of flow is influenced in that a a higher degree of separation results.

The protrusions 20, which can also be termed knob-like, serve thereby not only to form further flow chambers influencing the fluids, but simultaneously imbue every section part with an inherent stability. Through this section parts 10, 12 of longer lengths can be held by holding elements without additional support, preferred embodiments of which can be deduced from FIGS. 1 and 2.

Thereby each holding element 25, 44 consists of a plate-shaped base element 26, from which strip-like sections 28, 29 and 30, 31 emanate and are angled so that at least sectionally the outer surface 36, of the section parts 10 and 12 are grasped. The sections 28 and 30 angled off from the base element 26 also have spring properties in order to thus guarantee a secure holding of the section parts 12. The free ends of the strip-like sections 28 and 30 are facing away from each other, therefore they extend roughly parallel to the base plate 26. Thereby the distance of the end sections 40, 42 facing each other from two consecutive holding elements 25, 44 is so chosen that the protrusion 46 extending in the longitudinal direction of the inner surface of the section part 10 is grasped (FIG. 1a). Thereby the chosen form of protrusion 46—in cross-section knob-like—supports the holding function of the holding elements 25,44 between the sections 40, 42. For assembley the single holding elements 25, 44 only have to be placed in a row side by side in a track 48 of a holder 47, in order to guarantee fixed position. Furthermore the holder 47 has a shank 50 angled off from the track 48, said shank covering the section parts 10, 12 in the front area, so that the fluids flowing through the section parts 10, 12 cannot escape at the side areas. Consequently the section parts 10, 12 are fixed in a detachable manner in the single elements 25, 44 which are in a row together in the holder 47, thus enabling section parts 10, 12 to be easily cleaned or if necessary to be renewed if damaged. Furthermore the section parts 10, 12 with the opening facing the fluids are displaceable on their longitudinal axis, thus enabling the chamber cross sections flowed through by the fluids to be further influenced.

In principal the embodiments in FIG. 1 and 2 only vary in the type of holders 47 or 52, without otherwise having essential differences. For this reason the same reference nos. have been chosen for the same elements. Independantly from this, due to the construction of the section parts 10 and 12 and their holding elements 25, 44 or respectively holder 47, 52 a separator is provided which can be easily adjusted to the required size. This enables the number of the holding elements 25, 44 to be placed in a row side by side to the required extent and the section parts 10, 12 to be cut to the required length.

The holding elements 28, 29 and 30, 31 which compose the sections 12, 30 which can be spring elements, can for example be made of aluminium, special steel, spring steel or also plastic. The same applies to the section parts 10, 12, which can be extruded parts or cue cast parts made of plastic.

Figure 3:
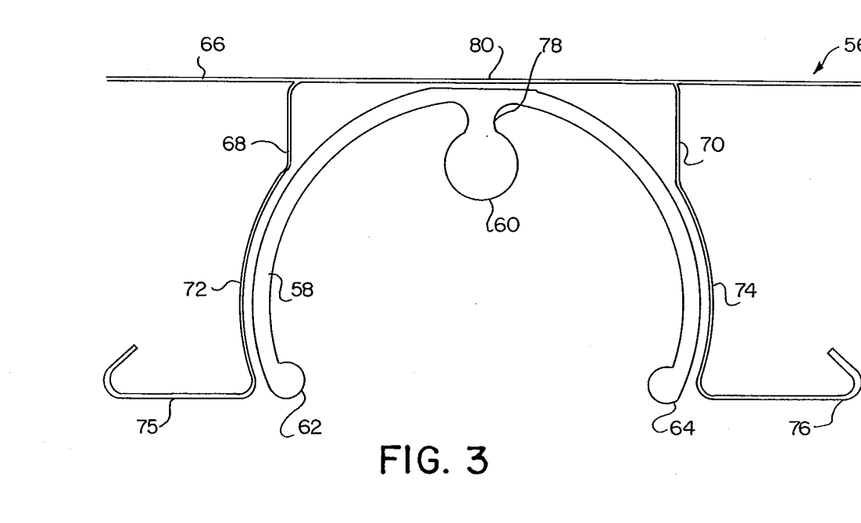
FIG. 3 shows: a detailed representation of a section part with the holding element retaining the former in cross-section.
Figure 4:
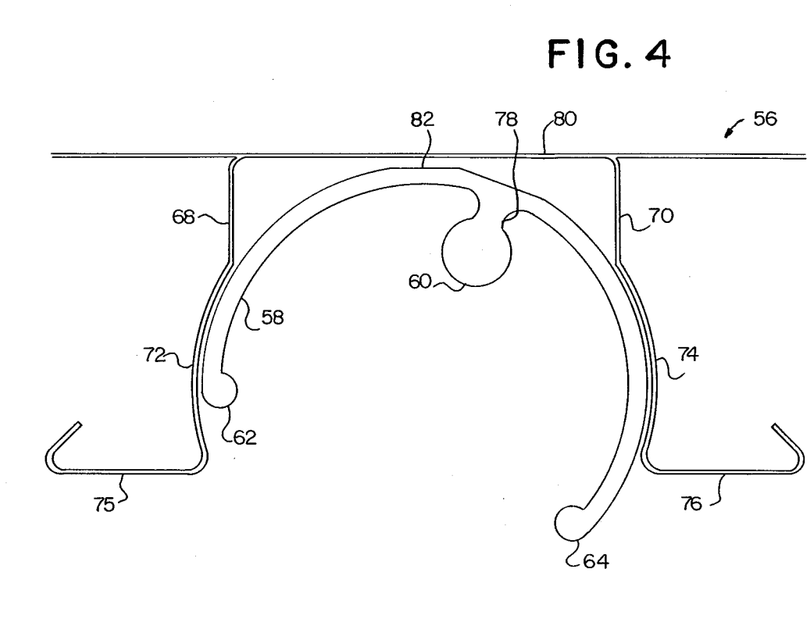
FIG. 4 shows: a sectional representation of a section part with holder according to a further embodiment.

FIGS. 3 and 4 represent a section part 58 contained in a holder 56 having in cross-section mainly a circular arc shaped geometry extending beyond a semi-circle. Furthermore a protrusion 60 is provided in the crown area of the section part 58 emanating from an inner surface, said protrusion —as already mentioned—raising the longitudinal stability of the section part 58 on the one hand and apart from this leads to the forming of a further chamber during the cooperation of edge areas (not represented) of section parts which extend down into the inner area of the section part 58, the fluids to be cleaned having to flow through this new chamber. The formation of chambers can be increased by developing the edges 62, 64 of the section part 58 with a bead shape. The holding element 56 has a construction as in FIGS. 1 and 2, consists therefore also of a plate-shaped base element 66, from which two strip-like sections 68 and 70 with spring properties are angled off, which encircle encircled partially sectionally the outer area of the section part 58 in their vertically extending areas 72, 74 to fix them. Protrusion 60 is grasped between angled and sections 75, 76 at their tapering off area 78. In this way the section parts are fastened with their outer areas facing the fluid. The grasping of the protrusion can be better understood by referencing the Sections 40, 42 of FIG. 1.

If the construction of the holding elements 56 guarantees that the section part 58·is rotatable on its longitudinal axis then there can be a fixed position through the flat 80 (FIG. 3) or 82 (FIG. 4) present on the outer surface. This ensures that the section parts cannot rotate in an uncontrolled manner. Otherwise FIG. 4's construction does not vary from that of FIG. 3, so that the same reference nos. have been chosen for the same elements.

Figure 20:
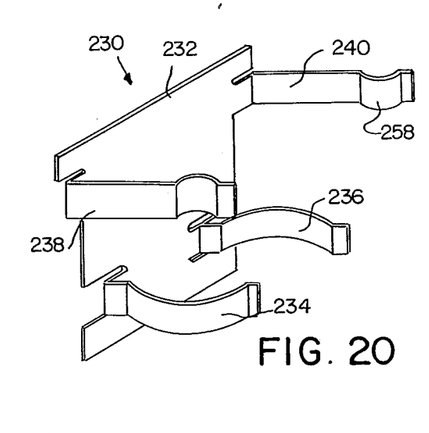
FIG. 20 shows: a further embodiment of a holding element.
Figure 21:
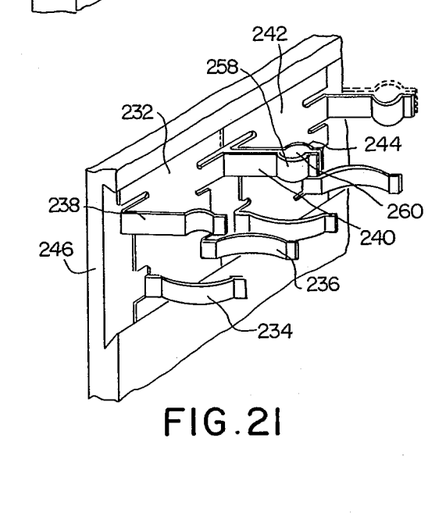
FIG. 21 shows: a retaining track for holding elements according to FIG. 20.
Figure 22:
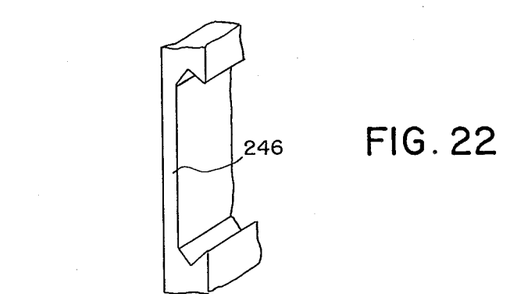
FIG. 22 shows: a sectional representation of the retaining track of FIG. 21.

FIG. 20 to 22 contain embodiments of holders 230 for the holding of trough-shaped section parts which should be particularly noted, whereby the main theme of the embodiments in FIG. 1 and 2 is adhered to. Thus angled limbs 234, 236, 238, 244 emanate from a base element 232 or 242, said limbs being arranged together in pairs. Thus the limbs 234 and 236 are arranged together in order to partly grasp on the outer side and thus hold tight a section part not shown which faces the fluids to be cleaned with its opening. Consequently the limbs 234 and 236 carry out the function of the sections 32 and 34 according to FIG. 1. The further limbs 238 and 240 of the base element 232 and the limb 244 of the base element 242 serve to retain the protrusions of the section parts whose openings are facing away from the ascending fluids which are to be cleaned. In order to grasp the inner protrusions of the section parts the end areas 258 and 260 of the limbs 240 and 244 have deformations which match the geometry of the inner protrusions. As a consequence the end sections 258 and 260 fulfil the function of the areas 40 and 42 of the holder according to FIG. 1.

The base elements 232 and 242 with the limbs 234, 236, 238, 240, 244 protruding off are then placed in a row together in retaining tracks 246, in order to thus hold the section parts in a detachable manner.

As the limbs arranged in a row—on the one side the limbs 234, 236, on the other side the limbs 238, 240, 244—are always only coordinated to section parts of one row, it is clear that removal is completely trouble-free without considerable strength having to be used, as would be the case with the construction according to FIG. 1.

Figure 5:
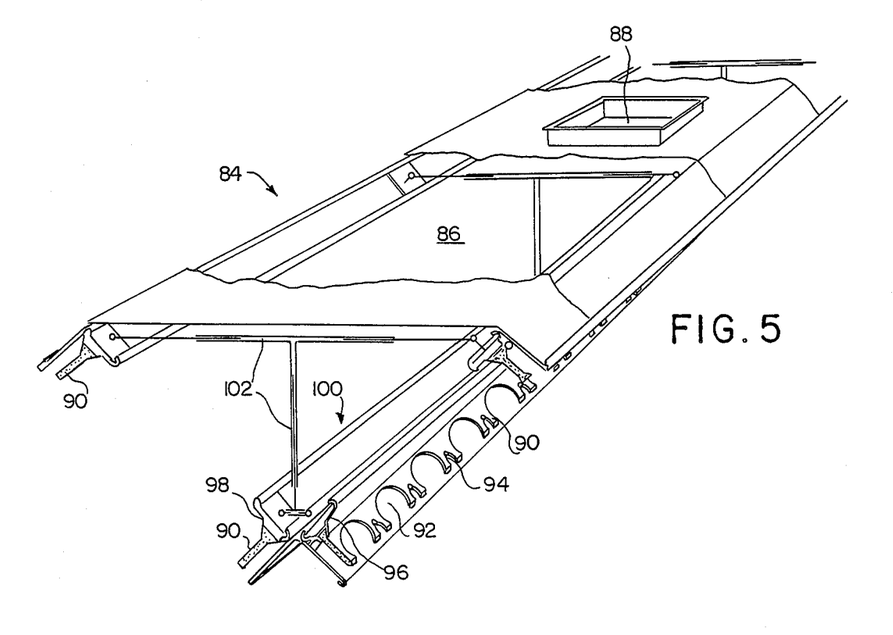
FIG. 5 shows: a perspective view of a separator, partly broken away.

FIG. 5 shows in perspective and sectionally a separator 84 purely in diagram in which section parts (not represented) are joined together to two surfaces which include a sharp angle to each other. In other words in cross-section the separator 84 has separation areas aligned in a V shape to each other through which the fluids to be cleaned flow in order to be led to an ventilation opening 88 via the inner area 86 of the separator 84, through which ventilation opening the cleaned fluids are sucked off. The section parts used in the separator 84 correspond to those in FIG. 1-4, so that to that extent their geometry is referred to. Contrary to embodiments previously described, the holding elements retaining the section parts are formed in a type of section part strip 90 which has recesses 92 and 94 alternating with each other. These recesses are chosen so that alternately one section part is held by partly grasping the outer area and the following section part is held by retaining the inner protrusion. The holding strips 90 can consist either of rubber or plastic or respectively of steel springs, ie. they have certain spring properties resulting not only in the section parts being held securely but also quietly. The holding strips 90 themselves can be retained in tracks 96 or 98 of holders 100. For this the holding strips 90 have rail-like limbs 103 and 104 extending on one level in the upper edge area. (Of course the holding strips 90 can be exchanged for the holding elements 26 or 44 and vice versa.)

As the drawing representation in FIG. 5 clarifies, the holding elements retaining the holding strips 90 are coupled together in such a way for example via rods or cable lines 102 that they can be tipped in the same direction in such a way that the angle of inclination of the surfaces formed by the interlocking section parts is adjustable.

With the separator 84 according to FIG. 5 there is also the advantage that section parts available per meter can be used for the single section parts, which then only have to be cut to the required size. Furthermore the whole separator 84 no longer needs a rigid frame, as is familiar from the state of the art. The section parts are also arranged in the separator 84 in a detachable manner, so that cleaning or renewing is easy.

Figure 6:
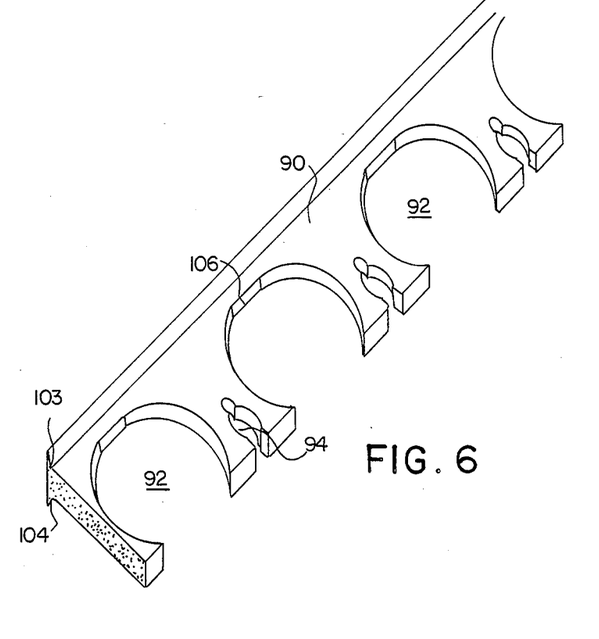
FIG. 6 shows: a holder for section parts in detailed representation.

Finally the detailed representation of the holding strip according to FIG. 6 clarifies that a flattened portion 106 is provided in the crown area of the recess 92 in which the section parts are inserted and whose openings are directly facing the fluids, in order to fix the section parts exactly in position, said section parts having a corresponding flattened portion on the outer surface, as is described in connection with the section part in FIG. 3 and 4.

Figure 9:
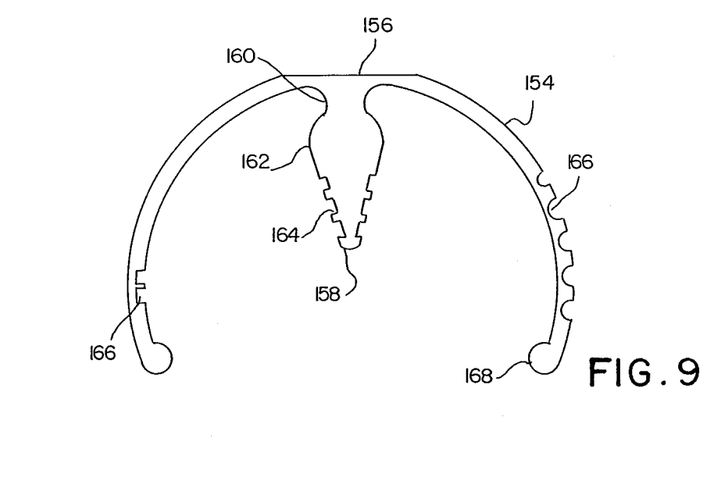
FIG. 9 shows: a further embodiment of a section part in cross-section.

A sectional representation of an embodiment of a further section part 154 according to the invention can be drawn from FIG. 9. It can be seen that the section part 154 has an arc-like form whose free edges 168 are shaped facing each other. From the inner surface of the section part 154 a protrusion emanates extending in the longitudinal direction of the section part, resulting in a further division of the room or rooms surrounded by the section part 154 into chambers, said rooms being formed by the other section parts penetrating into section part 154. This results in the speed of flow of the fluid being further influenced and thus the degree of separation being considerably increased.

In the embodiment the protrusion 158 has a knob-like form in cross-section, consists therefore of a neck 160 and an adjoining main body 162 which at first widens and then tapers off to a point. In its outer surface and preferably in the area of the free end there is a texturisation 166, which in the drawing representation in an exemplary manner in the form of protrusions and recesses 164. This produces an additional swirling of the fluids flowing past, through which not only is the degree of separation increased but results simultaneously in the automatic cleaning of outer areas of the protrusion 158. Consequently a separator constructed from section parts according to the invention requires less maintenance.

Such a texturisation can also be provided on the inner and/or outer surface of the section part 154. It can also be formed by protrusions or recesses 166 or by surface sections describing angles to each other.

Finally it should be noted that the free edges 168 of the section part 154 is strengthened, for example bead-like, resulting in an additional influence on the speed of the fluids flowing past.

The section part according to FIG. 9 can also be arranged in a frame in a detachable manner. In order to void uncontrolled rotation a levelling off 156 is provided. The section part 154 can of course also be fixed tightly, ie. not in a detachable manner, in a frame. The main characteristics and advantages which characterise the invention are not abandoned through this. Decisive for this is namely that a further protrusion 158 is provided, preferably projecting from the middle area inwards, resulting in the forming of further chambers which influence the speed of the fluids flowing through to the extent that a higher degree of separation and thus cleaning is guaranteed.

Further embodiments of the construction of section parts can be drawn from FIGS. 10-16.

Figure 10:
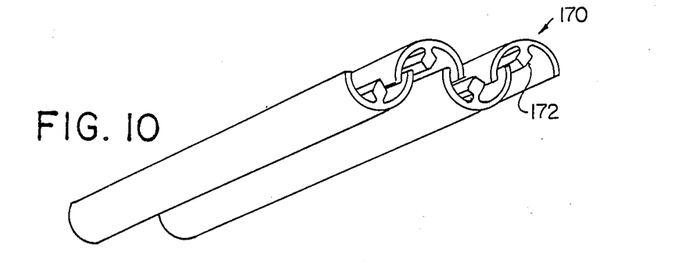
FIGS. 10 to 16 show: a perspective representation in sections of varying embodiments of separators.

Thus the section parts 170 are formed as hollow section parts according to FIG. 10, whereby the protrusion 172 extending along the longitudinal axis is also hollow. Media of an adjustable temperature can if necessary flow through corresponding section parts 170 in order to achieve the separation of particles or fluids within the section parts 10 in required spots, so that cleaning is facilitated still further.

Figure 11:
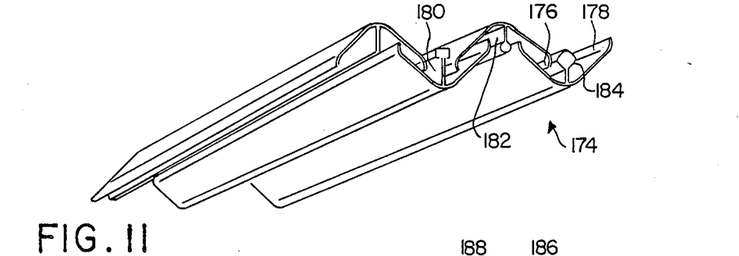

In cross-section the section part 174 according to FIG. 11 can be termed V shaped, whereby the edge areas 176, 178 of the section parts facing each other can extend parallel to each other. The inner protrusions 180, 182 and 184 can have varying geometries thereby, ie. for example they can have a rectangular form, a circular or a drop shape in their free end area. The front ends emanate thereby in each case from the inner area of the section part 174 via a rail.

Figures 12, 13:
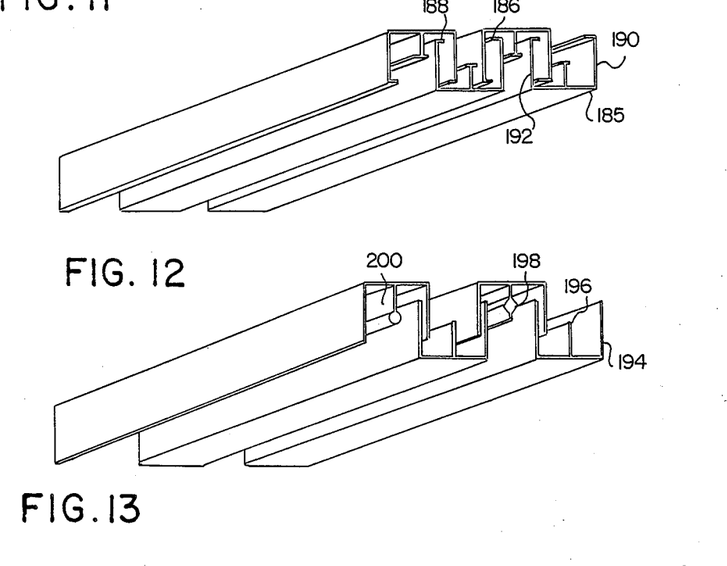
Figure 14:
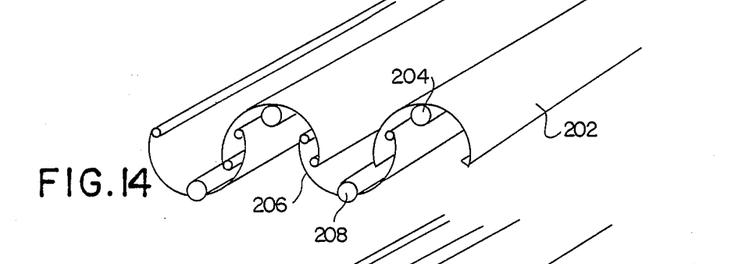

The possibility of also forming the section parts in rectangles is clarified by FIGS. 12 and 14. The section parts 185 according to FIG. 12 show in cross-section an angular U shape, whereby the free ends 186 and 188 of the lateral limbs 190 and 192 are angled inwards and extend on one level. This also results in the forming of chambers by two interlocking section parts 185.

The section parts 194 according to FIG. 13 have a purely angular U shape, whereby the inner protrusions 196, 198 or 200 can have varying geometries. Thus, next to a simple rail 196 extending parallel to the lateral limbs a form can also be chosen with which the rail changes into a configuration in cross-section circular (ref. no. 200) or respectively rhombus-shaped (ref. no. 198).

Figure 16:
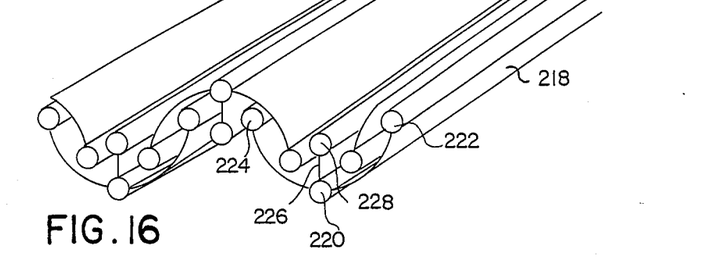

The embodiments in FIG. 14 and 16 should also be especially noted.

Thus the section parts 202 are copied from those in FIG. 4 and 9. However the inner protrusion 204 is formed by a pipe-shaped element extending in the longitudinal direction of the section part 202, through which a medium of adjustable temperature can flow if necessary. The element forming the protrusion 204 can thereby emanate from the inner surface of the section part element 202 or can also be completely integrated in the pipe as indicated in the case of section part 206 with the internal protrusion 208.

Figure 15:
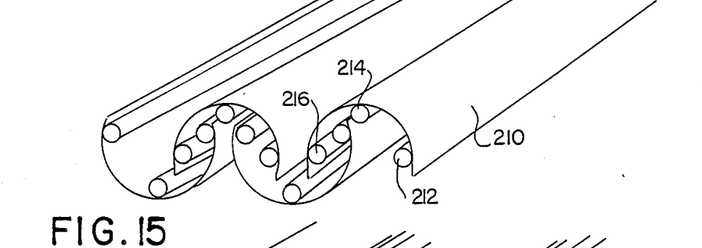

The possibility also exists of not necessarily forming the inner protrusions as an integral component of the section parts, but rather of laying section parts 210 —for example extruded, arch-shaped section parts—over pipes 212, 214 and 216, to lock over these in order to achieve the same effect which should be reached by the teaching according to the invention. The pipes 212, 214 and 216 and the section part 210 extending over the pipes result in a geometry according to FIG. 4, whereby there is also the advantage that fluids can flow through the pipes 212, 214, 216.

FIG. 16 shows section parts 218 which have pipe-shaped elements 220, 222 and 224 in their middle and edge areas, whereby a further pipe 228 extends along the longitudinal axis of the section part 218 from the middle element 220 via a rail 226, in order to thus form the inner protrusion.

Figure 18:
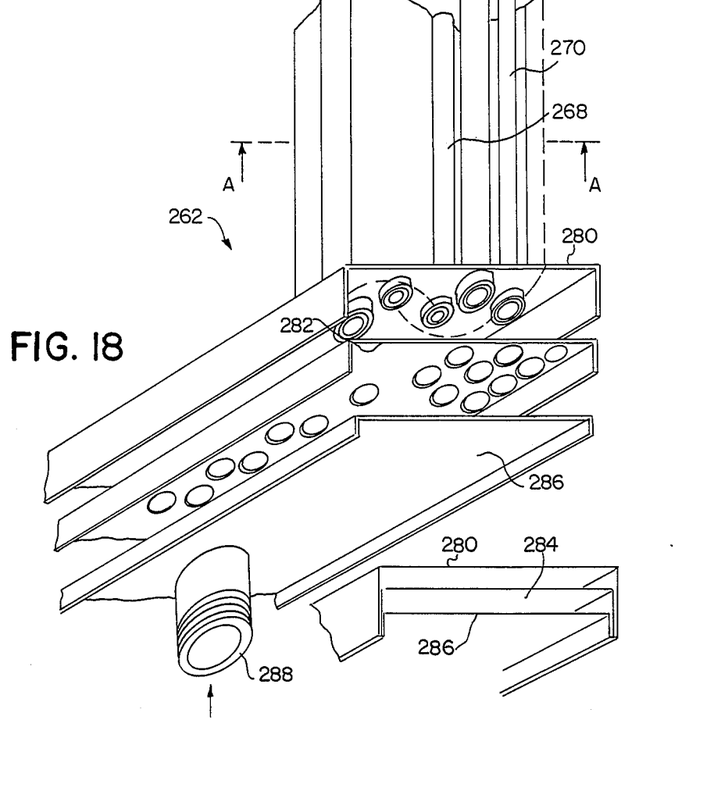
FIG. 18 shows: a further embodiment of a separator sectionally and in part exploded.
Figure 19:
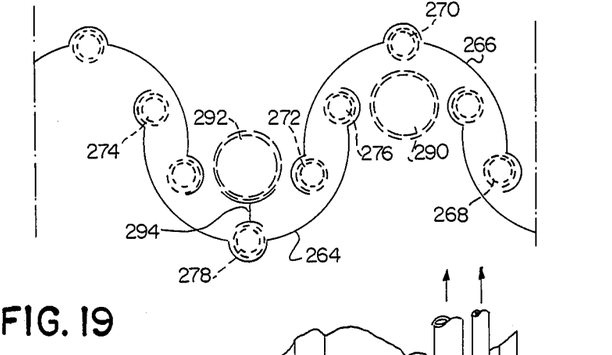
FIG. 19 shows: a sectional representation along the line A—A in FIG. 18

FIGS. 18 and 19 contain a further embodiment of the separator 262 according to the invention which should be stressed, which consists of arch-shaped section parts 264 and 266, which for their part are adjustable relevant to the temperature. For this pipe elements 268, 270, 272 or 274, 276 and 278 are arranged in a circle section in order to come into inner contact with the section parts 264 and 266 by snapping them open. The section parts 264 and 266 are thereby preferably extruded or rolled and made of aluminium. A medium of adjustable temperature such as water or also a gas can now flow through the pipe elements 268, 270, 272, 274, 276 and 278. In order to load the pipe elements 268 to 278 with the medium easily the former are soldered at the front end into for example a metal element 280. A perforated plate 282 is then coordinated with the front end openings of the pipes 268 to 278 so that from an interspace which can be later termed chamber 284 which in its turn is closed off by a closed metal element 286, media of the required temperature can flow into the pipe elements 268 to 278.

The elements 280, 282 and 286 assembled together, which as mentioned extend along the front ends of the section parts 266 and 264 or respectively of the pipe elements 268 to 278, are represented in the lower part of FIG. 18. In the exploded representation of the single metal elements 280, 282 and 286 are shown spaced apart. It can be seen that the element 286 has a inlet opening 288 through which the media can flow into the chamber 284 and thus into the pipe elements 268 to 278.

As FIG. 19 further shows, between the overlapping section parts 264 and 266 a further pipe-shaped element 290 can also be arranged which also opens in the chamber 284, so that a medium of adjustable temperature flows through. Through the additional pipe elements 290 and 292 the degree of separation can be additionally raised.

As the pipe elements 290 and 292 also emanate from the holding elements 280 to 282 arranged on the front side, these can be connected loosely between the section parts and spaced apart—as is section part 292—can be connected with the middle pipe element 268 via a rail-like element 294. In the main the elements 290 and 292 carry out the function of the inner protrusion thereby, as was previously described with numerous embodiments.

The types of embodiment in FIG. 18 and 19 show the advantage that the section parts 264 and 266 are connected in a detachable manner with the pipe elements 268 to 278, so that the former can be easily removed and thus cleaned. Separators of the required surface areas can also be easily produced, as the single elements only have to be cut off to the required size in order to be then joined to holding elements such as metal elements 280 and 282 which extend at the front edge.

Figure 7:
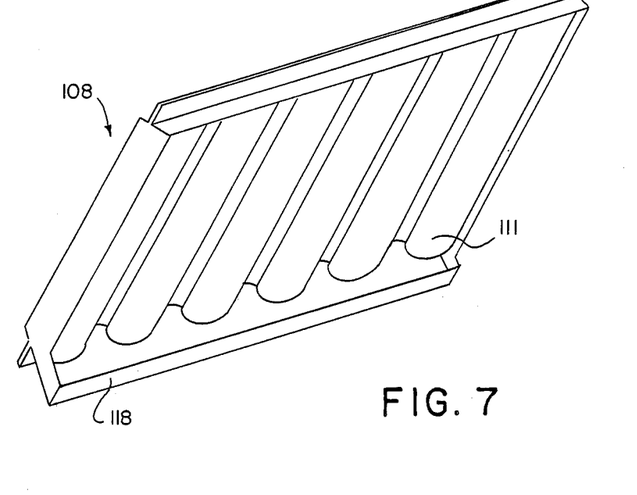
FIGS. 7 and 8 show: further embodiments of separators.
Figure 8:
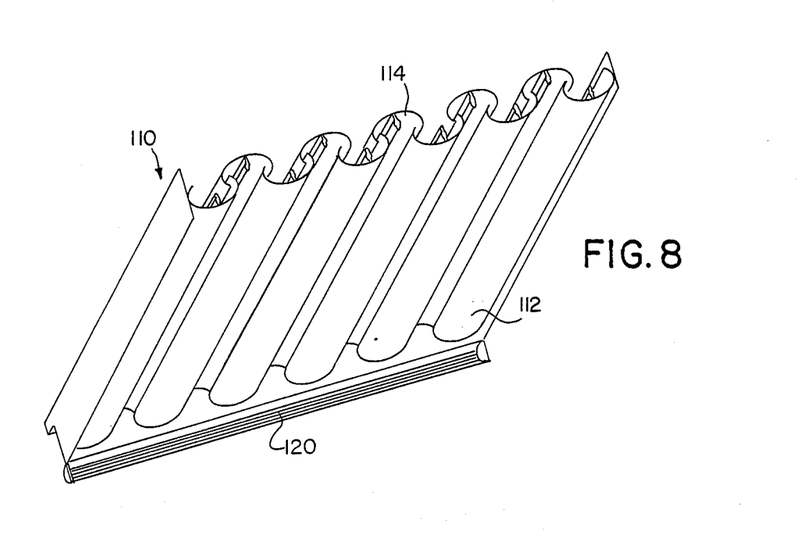

FIGS. 7 and 8 should represent a further embodiment of separators 108 or 110 with section parts 109, 111 and 114, 112, respectively which can be arranged slanted relative to the rising fluids to be cleaned. A collection area formed by detachable collecting area 118 or 120 is placed in the lower area 111 or 112 of the interlocking section parts 109 and 114 in this case in cross-section ellipse sections, in which said collection area dirt such as precipitated oil can collect. To clean the separator 108 or 110 the fluid separated only has to be drained off, without the section parts themselves necessarily having to be cleaned (as shown in dotted lines). This is a decisive advantage over traditional separator plates. In the case of these—whether fabric filters or swirling separator plates—the grease runs into the inside of the casing to be drained off from there. However this is hardly possible, as the fat congeals in the casing and the drainage element becomes blocked.

The usual constructions also represent a considerable danger of fire in the casing behind the filter element. With the proposal according to the invention the grease runs outwards and can be thus removed easily.

A further advantage of the invention is that the section parts can be placed together to form separator plates in order to be placed in familiar frames or hoods. However the properties described earlier of the detachable arrangement of the section parts, and if necessary their adjustability or the collection of grease for examples are adhered to thereby.

Figure 17:
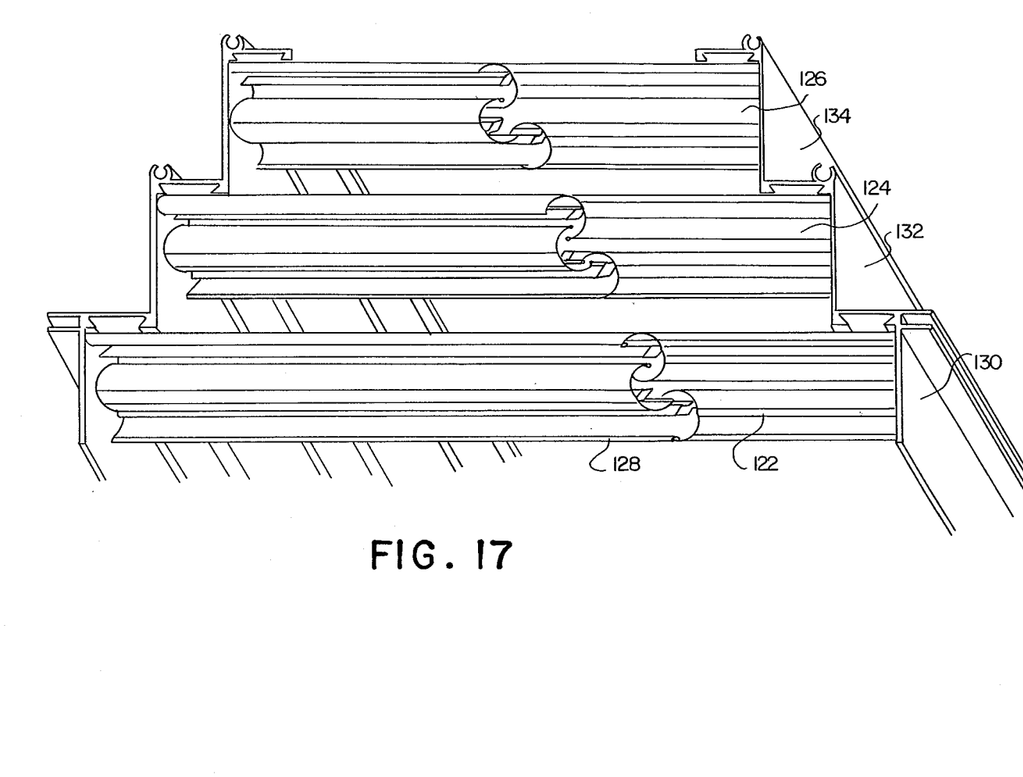
FIG. 17 shows: a detailed representation of a separator of cascade-like construction.

In particular an embodiment shown in FIG. 17 should be noted. Section parts formed according to the invention are arranged on top of each other in rows in order to permit a multi-staged separation. The section parts 128 are thereby arranged detachably in frame elements 130, 132 and 134 on the single levels 122, 124 and 126, so that easy cleaning is possible. With the embodiment form in FIG. 17 there results a cascade arrangement which guarantees that the fluid emitted from the top level 126 is completely cleaned.

What I claim:

1. A separator for gaseous fluids containing solid or liquid contaminants comprising first section parts and second section parts, each of said parts being open and trough-shaped in cross section, said first parts being arranged in a first row, said second parts being arranged in a second row opposite said first row, each of said parts having free longitudinal edges, said edges of said first parts overlapping and spaced apart from said edges of said second parts said first or second section, parts being detachable from a support.

2. The separator of claim 1 wherein at least some of said parts are adapted to revolve around their longitudinal axes.

3. The separator of claim 2 wherein said section parts have at least one flat surface to inhibit revolution.

4. A separator for gaseous fluids containing liquid or solid contaminants comprising first section parts and second section parts, each of said parts being open and trough-shaped in cross section, said first parts being arranged in a first row, said second parts being arranged in a second row opposite said first row, each of said parts having free longitudinal edges, said edge of said first parts overlapping, partially enclosing, and spaced apart from said edges of said second parts, said first parts having a longitudinal protrusion emanating from the area of said first part not overlapped by said second parts, said second parts having a longitudinal extending protrusion emanating from the area of said second part not overlapped by said first parts whereby the flow rate of said fluids is varied.

5. The separator of claim 4 wherein said longitudinal protrusion tapers towards its extremeties.

6. The separator of claim 4 wherein said longitudinal protrusion is drop-shaped or knob-shaped in cross section.

7. The separator of claim 4 wherein said edges are reinforced.

8. The separator of claim 4 wherein said separator is provided with a collecting element adapted to receive substances precipitated from said fluids, said element being at a lower end of said section parts.

9. The separator of claim 4 wherein said section parts are arch, U, or V shaped in cross section.

10. The separator of claim 4 wherein said protrusions are hollow.

11. A separator according to claim 4 wherein said longitudinal protrusion comprises pipes through which cooling media are adapted to flow.

12. The separator of claim 4 wherein said longitudinal protrusion is texturized at least partially.

13. The separator of claim 12 wherein said longitudinal protrusion is texturized longitudinally in the form of recesses.

14. The separator of claim 4 wherein at least some of said parts are at least partially texturized.

15. The separator of claim 14 wherein said parts are texturized in the form of recesses.

16. The separator of claim 4 wherein said section parts are fixed by holding elements emanating from tracks.

17. The separator of claim 16 wherein said tracks for holding said first parts are adjustable in the same direction and to the same extent as said tracks for holding said second parts.

* * * * *